United States Patent
Okamoto et al.

(10) Patent No.: US 7,230,650 B2
(45) Date of Patent: Jun. 12, 2007

(54) DATA TRANSMISSION METHOD, DATA RECEIVING METHOD, VIDEO DATA TRANSMISSION APPARATUS AND VIDEO DATA RECEIVING APPARATUS

(75) Inventors: Hiroshige Okamoto, Kanagawa (JP); Tetsuya Hiroe, Kanagawa (JP); Sho Murakoshi, Tokyo (JP); Naoki Ejima, Osaka (JP); Toshiroh Nishio, Osaka (JP); Akihisa Kawamura, Osaka (JP); Hidekazu Suzuki, Nara (JP)

(73) Assignees: Sony Corporation (JP); Matsushita Electric Industrial Co., Limited (JP)

( * ) Notice: Subject to any disclaimer, the term of this patent is extended or adjusted under 35 U.S.C. 154(b) by 721 days.

(21) Appl. No.: 10/239,679

(22) PCT Filed: Jan. 28, 2002

(86) PCT No.: PCT/JP02/00597

§ 371 (c)(1),
(2), (4) Date: Jan. 22, 2003

(87) PCT Pub. No.: WO02/062063

PCT Pub. Date: Aug. 8, 2002

(65) Prior Publication Data

US 2003/0147005 A1   Aug. 7, 2003

(30) Foreign Application Priority Data

Feb. 1, 2001   (JP)   ............................... 2001-026118

(51) Int. Cl.
*H04N 7/08*   (2006.01)

(52) U.S. Cl. ...................... 348/473; 348/476; 348/478; 348/465; 348/423.1

(58) Field of Classification Search ................ 348/473, 348/478, 475, 476, 477, 467, 469, 460, 461, 348/465, 725, 723, 738, 426.1, 434.1, 435.1, 348/423.1
See application file for complete search history.

(56) References Cited

U.S. PATENT DOCUMENTS 5,199,030 A * 3/1993 Ueda .......................... 389/96

(Continued)

FOREIGN PATENT DOCUMENTS

| JP | 5-129964 A1 | 5/1993 |
| JP | 9-179536 A1 | 7/1997 |
| JP | 2000-22771 A1 | 1/2000 |

OTHER PUBLICATIONS

DDWG (Digital Display Working Group), "Digital Visual Interface DVI" (online), Rev. 1.0, pp. 24 to 32, Apr. 1999.

*Primary Examiner*—Michael Lee
*Assistant Examiner*—Jean W. Désir
(74) *Attorney, Agent, or Firm*—Lerner, David, Littenberg, Krumholz & Mentlik, LLP

(57) ABSTRACT

The present invention is relative to a video signal transmitting/receiving system in which digital video signals are transmitted from a transmitter (30) to a receiver (50) using a line (9) as a transmission channel. The transmitter (30) converts the video signals to be transmitted to a bit string longer in data length than a pixel making up the video signals, allocates a plural number of the bit strings to a blanking period during which pixel data in the pixel string is not transmitted and, using these bit strings, transmits the same superposed data a plural number of times. The receiver (50) extracts the specified bit strings indicating the blanking period from the received data and performs majority processing on the results of demodulation of the extracted bit strings to decide on output data. This reduces errors in reception of supplementary data to simplify the circuit structure as well as to ameliorate the error rate.

12 Claims, 11 Drawing Sheets

U.S. PATENT DOCUMENTS

| | | | |
|---|---|---|---|
| 5,231,492 A * | 7/1993 | Dangi et al. | 348/14.12 |
| 5,406,569 A | 4/1995 | Isozaki | |
| 5,550,589 A * | 8/1996 | Shiojiri et al. | 348/386.1 |
| 5,910,822 A | 6/1999 | Yamaguchi et al. | |
| 5,940,070 A * | 8/1999 | Koo | 715/500.1 |
| 5,974,464 A * | 10/1999 | Shin et al. | 709/231 |
| 6,072,832 A * | 6/2000 | Katto | 375/240.28 |
| 6,141,691 A * | 10/2000 | Frink et al. | 709/233 |
| 6,151,334 A * | 11/2000 | Kim et al. | 370/468 |
| 6,564,269 B1 * | 5/2003 | Martin | 710/20 |
| 6,870,930 B1 * | 3/2005 | Kim et al. | 380/42 |
| 6,914,637 B1 * | 7/2005 | Wolf et al. | 348/473 |
| 2002/0163598 A1 * | 11/2002 | Pasqualino | 348/725 |

* cited by examiner

| | bit1 | bit0 | CTRL Code |
|---|---|---|---|
| S0 | 0 | 0 | 0010101011 |
| S1 | 0 | 1 | 1101010100 |
| S2 | 1 | 0 | 0010101010 |
| S3 | 1 | 1 | 1101010101 |

FIG.4

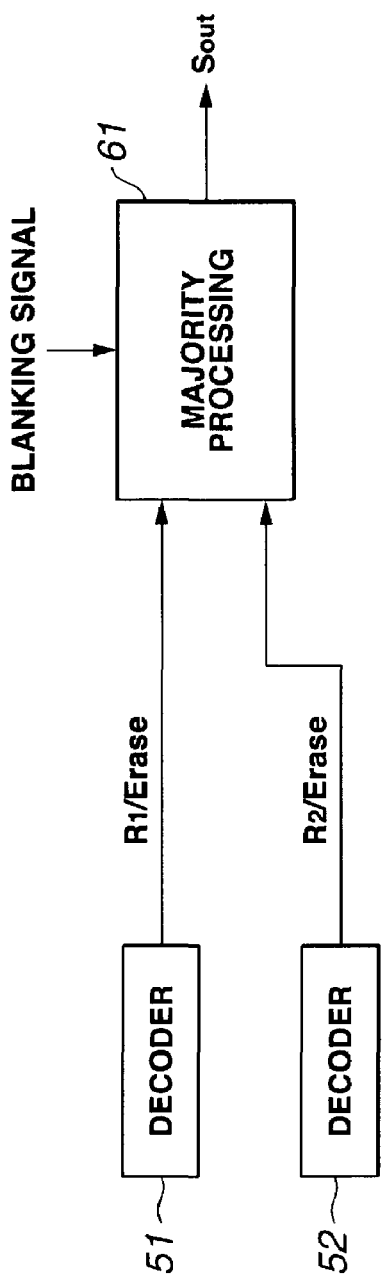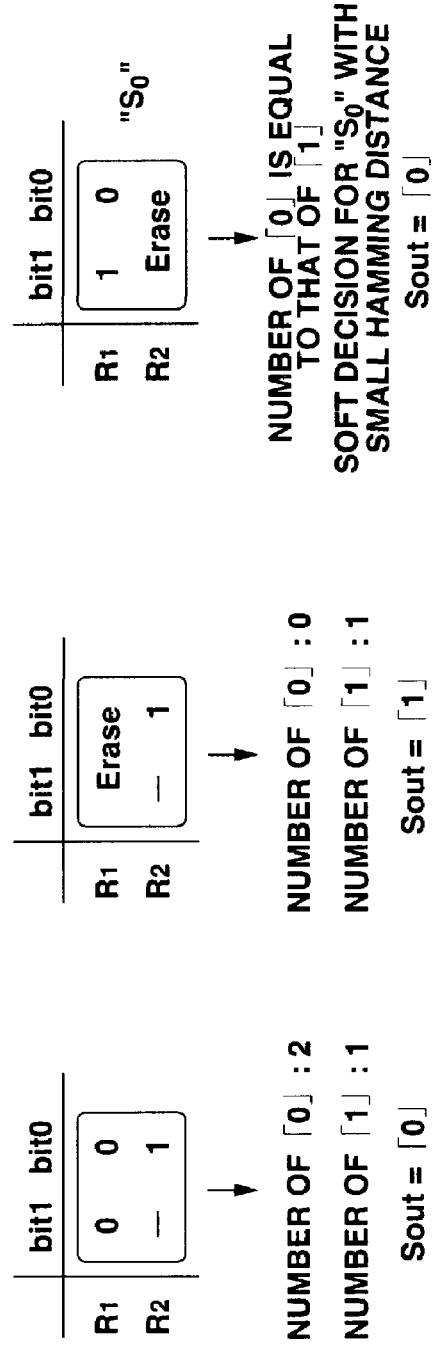

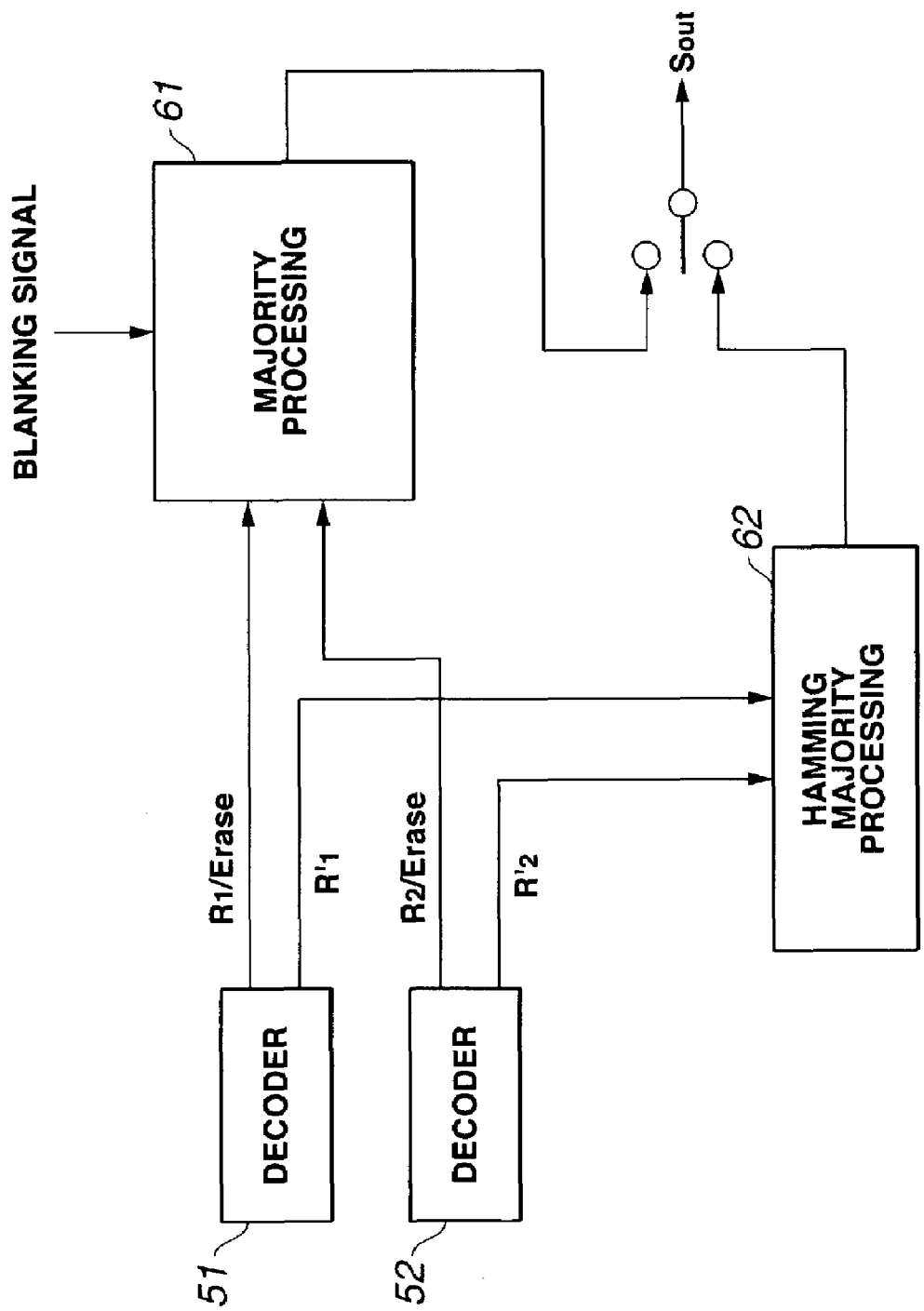

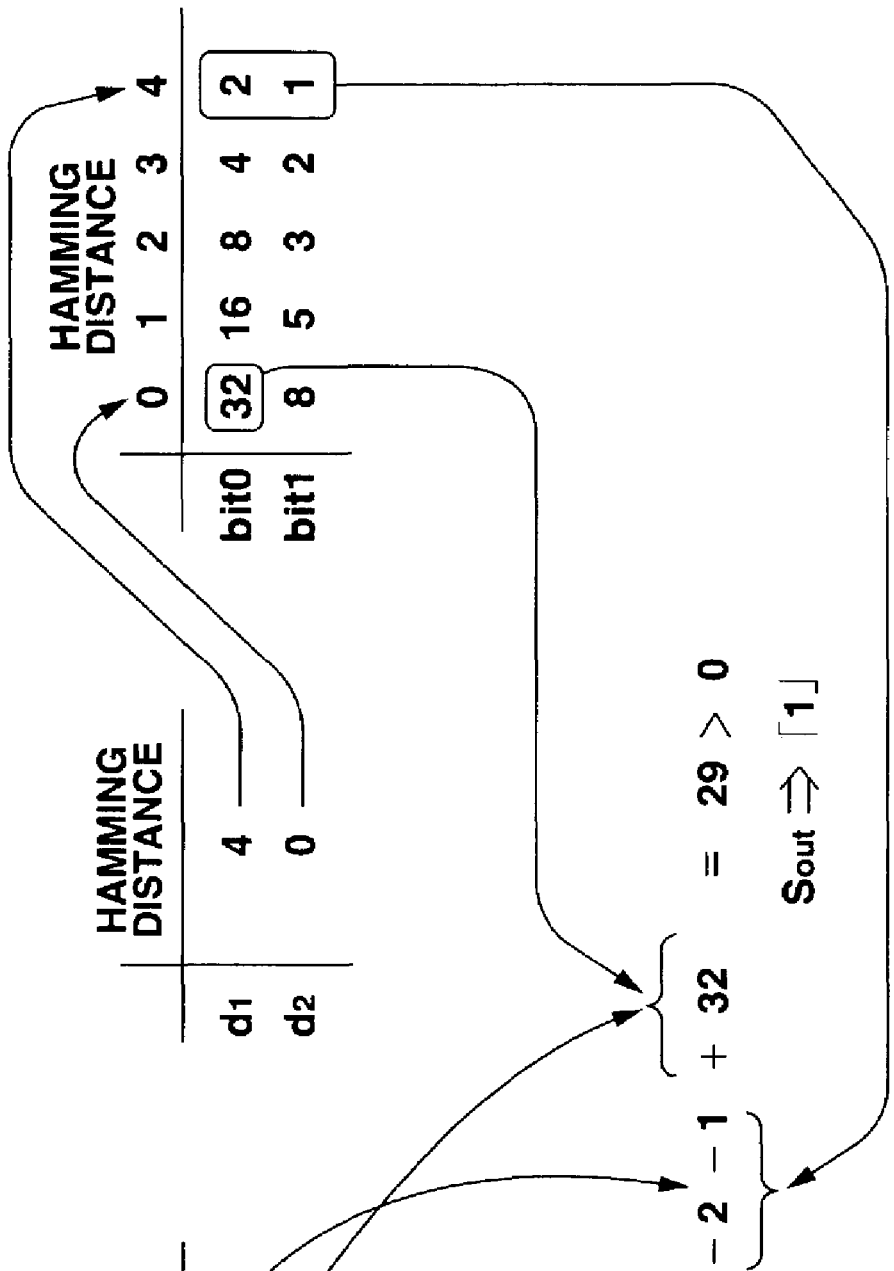

US 7,230,650 B2

DATA TRANSMISSION METHOD, DATA RECEIVING METHOD, VIDEO DATA TRANSMISSION APPARATUS AND VIDEO DATA RECEIVING APPARATUS

TECHNICAL FIELD

This invention relates to a transmission method, a receiving method, a transmission apparatus and a receiving apparatus for digital video signals. More particularly, it relates to a transmission method for transmitting control signals or supplementary data during the blanking period of digital video signals, and to a receiving method etc., for receiving data transmitted by this transmission method.

BACKGROUND ART

Up to now, in transmitting video signals to a liquid crystal display or a CRT, the mainstream has been to use an analog RGB interface to send video signals by analog transmission. However, in e.g., a liquid crystal monitor, the number of pixels that can be demonstrated is predetermined, such that, as the liquid crystal monitor has come into popular use, digital transmission has attracted attention. On the other hand, there is felt a need to increase the refresh rate for decreasing flicker, while there is also felt a need to send data at a high rate for displaying a picture on a screen of wider format. In the conventional analog transmission, transmission distortion is significant, such that ghost tends to be produced. Under this situation, more and more importance is attached to digital transmission in keeping up with the tendency towards higher picture quality.

For meeting the demand for digital transmission, DVI (Digital Visual Interface) has stirred up notice. This DVI is an interface for digital display connection defined by DDWG (Digital Display Working group) and transmits data using plural data channels based on the TMDS (Transmission Minimized Differential Signaling)technique. With use of the digital transmission method, employing DVI, it is possible to provide high quality video data of low transmission distortion at a low cost.

By employing the DVI, pictures of higher picture quality than are possible with analog transmission can be achieved. Moreover, the DVI provides, in addition to a period during which pixel data of RGB (red, green and blue) is transmitted, a blanking period during which it is possible to transmit data other than the RGB pixel data. This blanking period may be utilized to transmit audio signals, as an example.

In transmitting digital video signals, there may be produced transmission errors, such as garbled bits. In the case of video signals, transmission errors, if produced, are not outstanding on a screen, such that no serious problems are raised. However, if transmission errors are produced during transmission of audio signals, noises or extraneous sounds may be produced, and hence the problem of error rate needs to be tackled more rigorously than in the case of transmitting video signals. Specifically, if data other than video signals, that is data in which errors appear as outstanding, is to be transmitted during the blanking period of DVI, separate processing for error detection and correction is needed. Since in general the processing for error detection and error correction necessitates a larger quantity of hardware, the size of the apparatus tends to be increased, thus raising the cost.

DISCLOSURE OF THE INVENTION

In view of the above-depicted technical problems of the prior art, it is an object of the present invention to provide the aforementioned methods and apparatus capable of diminishing errors in reception of supplementary data.

It is another object of the present invention to provide the aforementioned methods and apparatus in which the circuit structure is simplified to improve the error rate.

The present invention, proposed for accomplishing the above objects, provides a system for transmitting control signals and supplementary data during the blanking period of the digital video signals, in which a transmitter repeatedly superposes data and in which a receiver performs majority processing to reduce the error rate. Specifically, the present invention provides a method for transmitting data using an interface for digital display connection including converting a video signal for transmission into a bit string longer than the data length of a pixel forming the video signal, allocating a plurality of the bit strings to a blanking period of the converted bit string during which the video signal is not transmitted, and transmitting the same superposed data a plural number of times using the plural bit strings allocated to one or plural transmission channels.

The superposed data transmitted means data added to video data transmitted and may be characterized by being transmitting using plural codes indicating the blanking period. The superposed data is desirably audio signals in that the audio signals, in which errors appear as outstanding in general in distinction from those in video signals as errors, can be transmitted in error-reduced state.

The present invention also provides a method for receiving data including receiving, which digital video signals are coupled to an interface for digital display connection and are provided with a blanking period represented by a plurality of sorts of bit strings, extracting, from the received digital video signals, specified bit strings indicating the blanking period, and performing majority processing on the results of demodulation of the extracted bit strings to decide on output data.

The present invention also provides an apparatus for transmitting video data including inputting means for receiving video data and superposed data, such as audio data, in which the video data is made up by R, G and B (red, green and blue) or luminance Y with chroma signals R-Y, B-Y, to be transmitted, and encoding means for converting the video data input from the inputting means into serial data and encoding a plurality of bit strings, allocated to a video blanking period, along with the same superposed data.

The present invention also includes an apparatus for receiving video signals including receiving means for receiving digital video signals, the receiving means being connected to an interface for digital display connection, the digital video signals receiving digital video signals including a blanking period represented by a plurality of sorts of bit strings, bit string extracting means for extracting specified bit string indicating the blanking period from the digital video signals received by the receiving means, demodulating means for demodulating the bit strings extracted by the bit string extracting means, and output data determining means for deciding on output data by majority taking from the results of demodulation by the demodulating means.

Preferably, the video signal receiving apparatus according to claim 7 wherein the output data determining means selects the one of the bit strings allocated to respective symbols as indicating the blanking period which has the smallest Hamming distance to the bit string received by the receiving means to decide on the output data to decide on the output data, because it is then possible to interpolate simple majority processing with which no sufficiently satisfactory results are obtained. By determining the output data based on the probability of the bit string with the smallest Hamming distance being an error, it is possible to take account of the probability of occurrence of the close state in transmission, by weighting, so that the error rate can be reduced advantageously.

From a different perspective, the video signal receiving apparatus of the present invention includes receiving means for receiving digital video signals in which the same sort of the bit string is sent a plural number of times in a blanking period represented by a plural number of sorts of the bit strings, and audio data outputting means for outputting audio data based on the same sort of the bit string, sent a plural number of times, from the digital video signals received by the receiving means.

The present invention also provides a program for use with a computer, which computer converts video signals to be transmitted by an interface for digital display connection into a bit string longer than the data length of a pixel making up the video signals to enable data transmission, the computer-readable program causing the computer to operate as including means for allocating a plurality of bit strings to a blanking period during which the video signal in the converted bit string are not transmitted and means for transmitting the same superposed data a plural number of times using the plural bit strings allocated to one or a plurality of transmission channels.

As for the method for furnishing this program, it may be furnished as a medium, such as CD-ROM, or from a program transmission device over a network, such as Internet.

Other objects, features and advantages of the present invention will become more apparent from reading the embodiments of the present invention as shown in the drawings.

BRIEF DESCRIPTION OF THE DRAWINGS

FIG. 4 illustrates code allocation in a present embodiment.

FIGS. 7A to 7D illustrate a majority processing method carried out by a majority processor.

FIG. 8 illustrates a second majority processing method carried out by a majority processor 55.

FIGS. 10A to 10D illustrate concrete examples of calculations by the third majority processing method shown in FIGS. 9A and 9B.

BEST MODE FOR CARRYING OUT THE INVENTION

Figure 1:
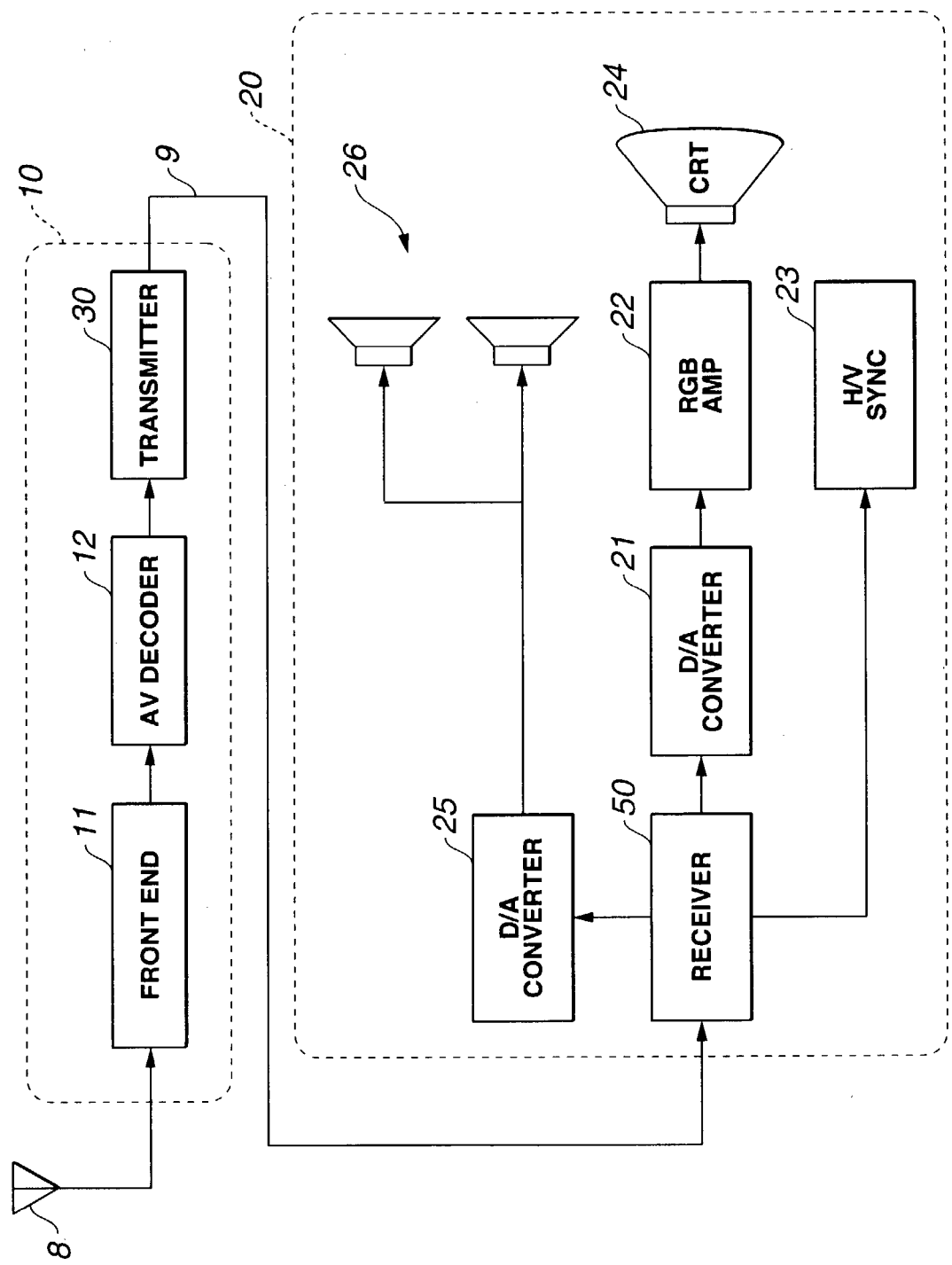
FIG. 1 shows an instance of a digital video signal transmission/reception system to which the present invention may be applied.

The present invention is now explained with reference to embodiments thereof illustrated in the drawings.

FIG. 1 shows an instance of a digital video signal transmission/reception system to which the present invention is applied. This reception system is roughly made up by a digital tuner 10, as a transmitter (transmitting device) for digital video signals, and a monitor 20, as a receiver (receiving device) for the digital video signals. The digital tuner 10 and the monitor 20 are interconnected by a line 9 supporting the DVI (Digital Visual Interface) as an interface for digital display connection.

The digital tuner 10 includes a front end 11 for receiving high frequency electrical waves, modulated from digital data of for example compressed pictures or speech, over an antenna 8, and for demodulating the received electrical waves to output compressed digital picture or speech data. An output from the front end 11 is decoded by an AV (Audio Visual) decoder 12 and delivered to a transmission unit 30 so as to be output as digital video signals over line 9.

The digital component video signals, sent to the monitor 20 over line 9, are input to a reception unit 50 for decoding. The decoded RGB pixel data are converted by a D/A converter 21 into analog signals, which analog signals are then amplified by an amplifier (RGB AMP) 22. An output from the amplifier 22 is synchronized by a horizontal/vertical synchronization signal (H/V SYNC) 23, acquired by the reception unit 50, for display on a CRT 24. On the other hand, the audio signals, obtained by the reception unit 50, are converted by a D/A converter 25 into analog signals so as to be output as speech over a loudspeaker 26.

Figure 2:
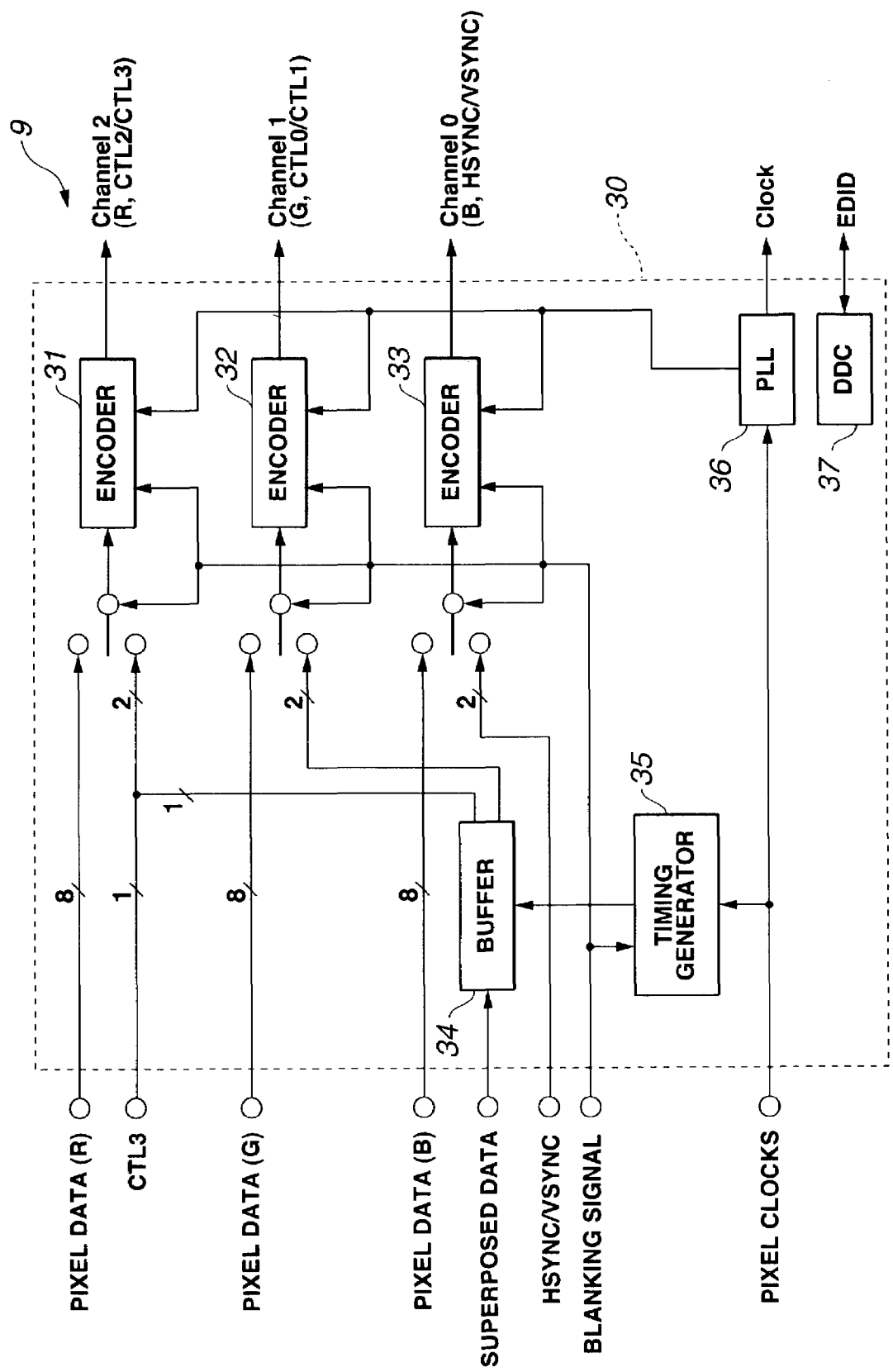
FIG. 2 illustrates the structure of a transmission unit.

FIG. 2 shows the structure of the transmission unit 30. The transmission unit 30, to which the present embodiment is applied, outputs digital signals, consistent with the DVI, to the reception unit 50 over line 9. This transmission unit 30 allocates, to the RGB video data, a code longer than the bit length of the RGB video data, for conversion to serial data, which serial data is transmitted. In addition, superposed data, as supplementary data, such as audio data, are transmitted by exploiting the blanking period. The superposed data is characterized by repeated transmission of the same data.

As a specified structure, the transmission unit 30 includes encoders 31 to 33, for converting the 8-bit RGB pixel data, input thereto, into 10-bit serial data, a buffer 34 supplied with the superposed data, such as audio data, for transiently storing the superposed data in timed relation thereto, and a timing generator 35 for receiving blanking signals and pixel clocks for generating the timing of outputting the superposed data. The transmission unit 30 also includes a PLL (Phase-Locked Loop) 36 for converting pixel clocks formed by parallel eight bits into clocks of serial 10 bits, and a DDC (Display Data Channel) 37 for transmitting/receiving the information as to an inquiry into synchronizable frequency to the monitor 20 and as to which functions are actually supported by the monitor 20. The superposed data of two bits and one bit, output from the buffer 34, are converted into 10-bit serial data and output to the receiver during the blanking period (video blanking period). A CTL 3, input to the encoder 31, may include the information pertinent to for example the control of the monitor 20. To the encoder 33 are input the horizontal synchronization signals (HSYNC) and vertical synchronization signals (VSYNC).

Meanwhile, there are occasions where video data made up by luminance signals (Y signals) and chroma signals (R-Y and B-Y signals) are input in place of the RGB pixel data.

Figures 3A, 3B:
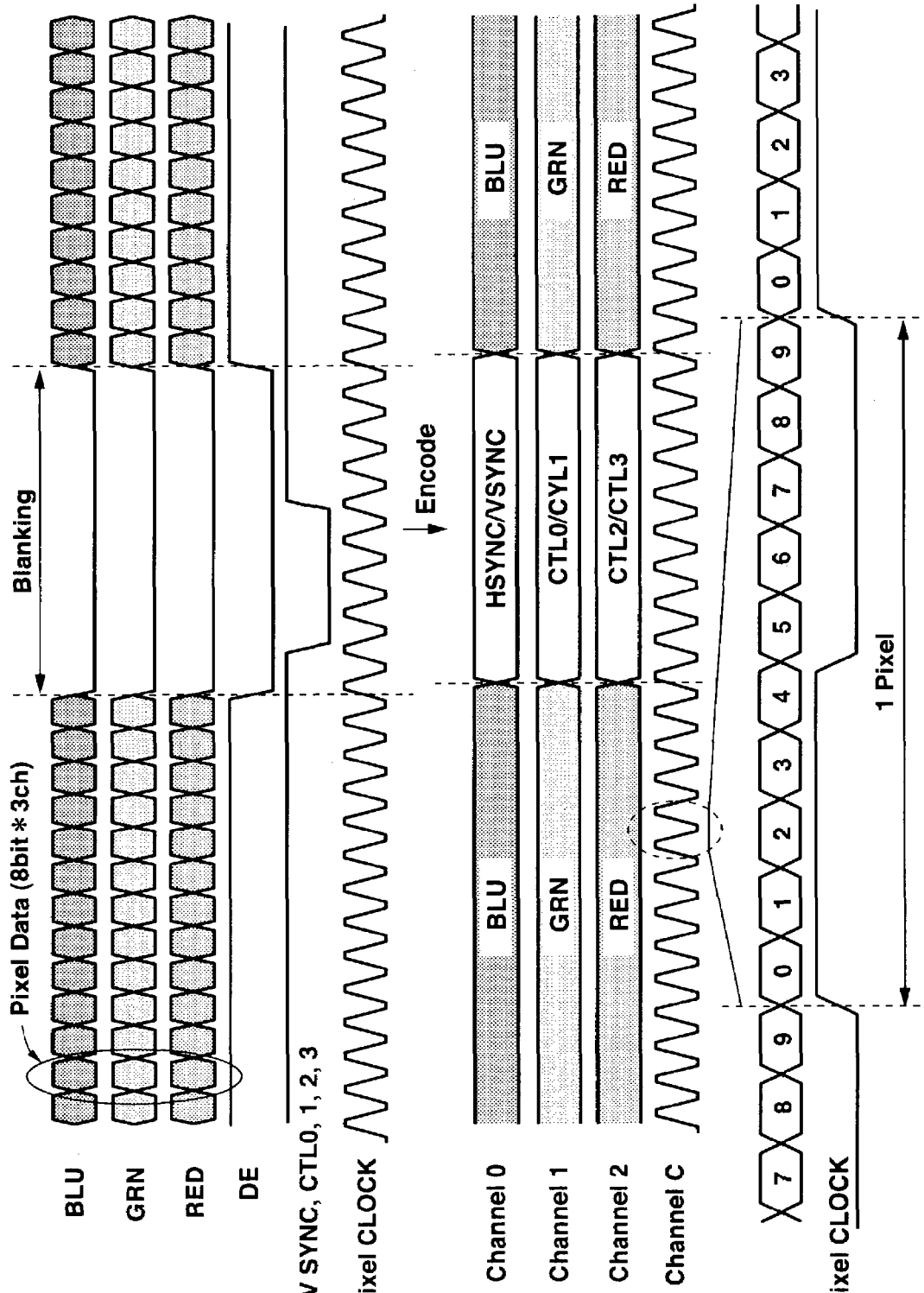
FIGS. 3A and 3B illustrate the DBI transmission timing.

FIGS. 3A and 3B illustrate the DVI transmission timing. FIG. 3A shows the transmission timing prior to inputting to the encoders 31 to 33, while FIG. 3B shows the DVI transmission timing subsequent to outputting from the encoders 31 to 33. Referring to FIG. 3A, a video blanking period (Blanking) is provided next to three-channel data of eight bits each for R, G and B. Referring to FIG. 3B, outputs of the encoders 31 to 33 are converted into 10-bit data which make up three independent channels, namely a channel 2, a channel 1 and a channel 0. That is, the pixel data of R, G and B are transmitted over independent channels 0 to 2 in such a manner that 10 bits make up a pixel. During the video blanking period, not only the horizontal synchronization (HSYNC) signals and vertical synchronization (VSYNC) signals, but also data other than the pixel data, using CTL0/CTL1/CTL2/CTL3.

FIG. 4 illustrates code allocation for the present embodiment.

Four codes can be allocated to the video blanking period, such that a period in which any of these codes exists may be determined to be the video blanking period. In FIG. 4, 10-bit control (CTRL) codes are allocated to (0, 0), (0, 1), (1, 0) and (1, 1) for (bit 1, bit 0) as four codes of $S_0$ to $S_3$. Using these four codes, 2 bits each of the respective channels, totaling at 6 bits, can be transmitted per pixel clock. The four bits of CTL0 to CTL3, excluding the horizontal synchronization (HSYNC) and vertical synchronization (VSYNC), may be used for transmitting the superposed data.

In the present embodiment, the same superposed data are repeatedly transmitted for e.g., three of CTL0 to CTL3, in transmitting the superposed data using the blanking period. One superposed data bit is transmitted with three bits of CTL0 to CTL2. At this time, temporally continuous data can be transmitted using the buffer 34 shown in FIG. 2. The repeated data may be transmitted with a shift of a preset number of clocks from channel to channel. By repeatedly sending the same superposed data in this manner, it becomes possible to reduce errors otherwise caused in the reception of the supplementary data.

Figure 5:
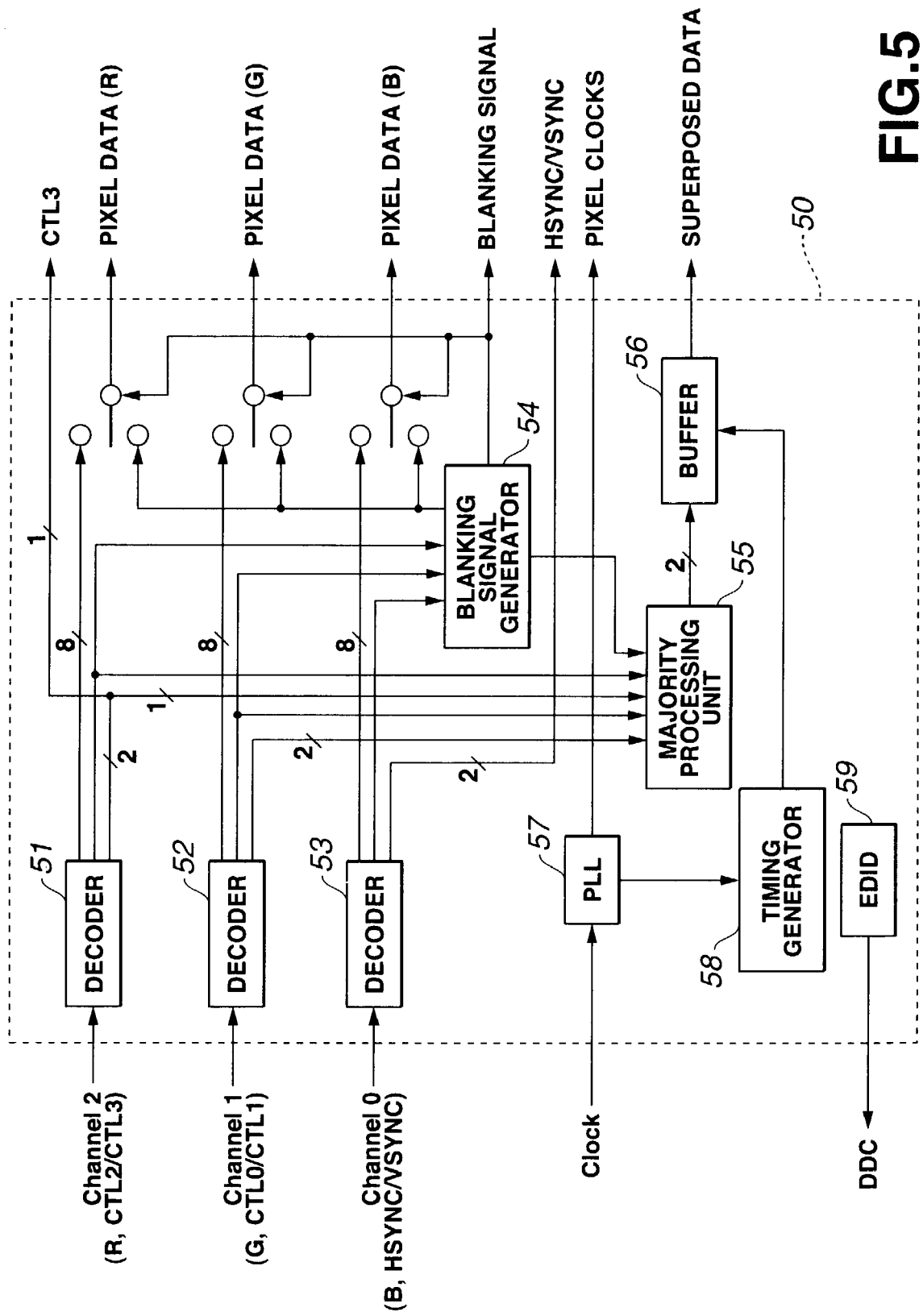
FIG. 5 illustrates the structure of a reception unit shown in FIG. 1.

FIG. 5 illustrates the structure of the reception unit 50 shown in FIG. 1. The reception unit 50 of the present embodiment includes decoders 51 to 53 for demodulating 10-bit serial data, output from the transmission unit 30, into RGB pixel data, each of 8 bits, and a blanking signal generating unit 54 for outputting a signal indicating the blanking period (blanking signal), each time the four codes allocated to the blanking period are input. The reception unit 50 of the present embodiment also includes a majority processing unit 55 to respective channels of which the demodulated results of the four codes are input to decide on the superposed data ultimately, and a buffer 56 for restoring the timing at the timing of transmission of for example the audio data to output restored timing data.

The reception unit 50 also includes a PLL 57 for generating serial 10-bit clocks from the transmitted clocks and for converting the so generated clocks into stable parallel 8-bit pixel clocks, and a timing generator 58 for generating the timing of outputting the superposed data based on the pixel clocks from the PLL 57. The reception unit 50 also includes an EDID (Extended Display Identification Data) 59 for transmitting the functions available at the monitor 50 to the digital tuner 10 as host device. Based on the blanking signals, output from the blanking signal generating unit 54, control is managed not to output RGB pixel data during the blanking period. The superposed data is output based on this blanking signal.

Figure 6:
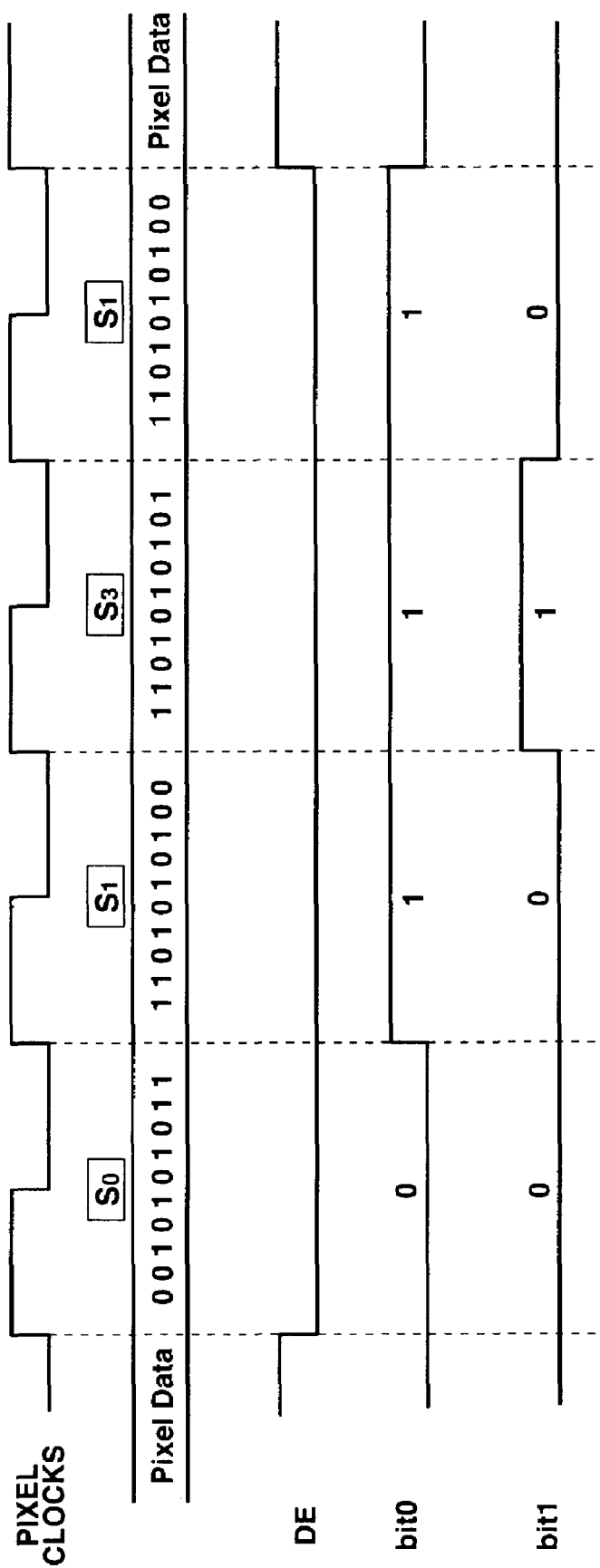
FIG. 6 is a timing chart for illustrating the decision by a reception unit as to data of a 10-bit string being transmitted.

FIG. 6 is a timing chart for illustrating the decision by the reception unit 50 on the 10-bit data string as transmitted. Here, pixel data and superposed data are received sequentially in keeping with the pixel clocks. The blanking signal generating unit 54 extracts a bit string, indicating the blanking period, from the 10-bit data, transmitted in keeping with the pixel clocks, and outputs the bit string, as a data enable (DE) signal is set to zero, such that correct blanking signals are generated from three channels of from channel 0 to channel 2. Moreover, the decoders 51 to 53 generate two bits for each of $S_0$ to $S_2$, based on the 10-bit data as transmitted, while the decoder 53 outputs HSYNC and VSYNC. On the other hand, 1 bit of the decoder 51 and 2 bits of the decoder 52 are output to the majority processing unit 55. The remaining one bit is output as CTL3.

In FIG. 6, 10-bit data are transmitted in the order of the codes $S_0 \rightarrow S_1 \rightarrow S_2 \rightarrow S_3$ shown in FIG. 4. Based on these 10-bit data, $0 \rightarrow 1 \rightarrow 1 \rightarrow 1$ is obtained for bit 0 and $0 \rightarrow 0 \rightarrow 1 \rightarrow 0$ is obtained for bit 1. The superposed data, such as audio data, for example, can be obtained by these bit strings.

Meanwhile, since CTL0/CTL1 is allocated to the channel 1, a bit 0 and a bit 1 are handled as CTL0 and CTL1, respectively. On the other hand, since CTL2/CTL3 is allocated to the channel 2, a bit 0 and a bit 1 are handled as CTL2 and CTL3, respectively. In the present embodiment, the same data is sent for e.g., three of CTL0 to CTL3 to reduce the error rate. Thus, in order to send the same data for CTL0/CTL1, a 10-bit CTRL code, derived from the codes $S_0$ and $S_1$, is sent from the transmitting side over the channel 1.

FIGS. 7A to 7D illustrate the first majority processing method executed by the majority processing unit 55. In FIGS. 7A, 7C and 7D, 'Erase' means a portion other than the blanking signal. This portion may be construed as having no data. From the decoder of each channel, $R_i$ and 'Erase' are output.

It should be noted that $R_i$ is comprised of combination of the bit 0 and the bit 1 obtained on decoding the 10-bit CTRL code. The Erase is output when the 10-bit bit string is not the blanking signal, that is when the bit string coincides with none of the bit string patterns of the four sorts of the CTRL codes shown in FIG. 4. In majority processing 61, the number of '1' and that of '0' in the three bits obtained from outputs $R_1$ and $R_2$ of the decoders 51, 52 are compared to each other, and the bit occurring more frequently on comparison is output as bit. The symbol 'Erase' is not counted. As an example of the three bit repetition, it is now assumed that such a repetition shown in Example 1 of the repetition of three bits, shown in FIG. 7B, is obtained. Since the number of '0' is 2 and the number of '1' is 1, so that the number of '0' is larger, '0' is obtained as an output $S_{out}$ of the majority processing 66. It is then assumed that, as an example 2 with 'Erase', such a repetition as shown in FIG. 7C is obtained. In this case, the symbol 'Erase' is discounted, the number of '0' is 0, and the number of '1' is 1. Since ultimately the number '1' occurs more frequently on comparison, '1' is obtained as an output $S_{out}$ of the majority processing 61.

As another example with 'Erase', it is assumed that a three-bit repetition of Example 3 as shown in FIG. 7D is obtained. There are occasions where the number of '0' and that of '1' become equal to each other, with the symbol 'Erase' of R2 being not counted. It is clear that a certain bit in transmission data, which is originally a repetition of '0' and '1', was garbled in the course of transmission. So, an output with a smaller Hamming distance is selected and output by soft decision, from the code allocation shown in FIG. 4. Since the Hamming distance between $S_0$ and $S_2$ is small and is 1, while that between $S_1$ and $S_2$ is also small and is 1, while the Hamming distance for other combinations is large and is equal to 9 or 10, the code $S_0$ is obtained for the code $S_2$, that is, '0' is obtained as an output $S_{out}$ of the majority processing 61, while the code $S_3$ is obtained for the code $S_1$, that is, '1' is obtained as an output $S_{out}$ of the majority processing 61. If all bits are 'Erase', the output may be '1' or '0', as desired.

FIG. 8 illustrates a second majority processing method, carried out by the majority processing unit 55. This second majority processing method is characterized by providing Hamming majority processing 62, in addition to majority processing 61, explained in FIGS. 7A to 7C. The Hamming majority processing selects a code with a closer Hamming distance and subsequently takes the majority. In case of 'Erase', each of the decoders 51 and 52 simultaneously outputs a symbol $R'_i$, with the smallest Hamming distance between the bit string received and the bit strings allocated to each symbol, such that decision based on this Hamming distance is taken into consideration. The 'Hamming distance' herein means the number of bits by which the received bit string differs from the original bit string. The smaller the number, the higher is the degree of coincidence between the two bit strings, whereas, the larger the number, the lower is the degree of coincidence between the two bit strings. The decoders 51, 52 compare the four CTL codes for the codes $S_0$ to $S_3$ to output codes $R'_1$, $R'_2$ with the smaller Hamming distances. The hamming majority processor 62 outputs one of $R'_1$, $R'_2$ output by the decoders 51, 52, respectively, whichever is larger.

That is, with the majority processing method, shown in FIG. 8, the output value is similar to that obtained with the first majority processing method shown in FIGS. 7A to 7C, such that the result of the majority processing 61 is obtained as $S_{out}$, except if all bits are 'Erase', that is if all data have been erased, or if the number of '1' is equal to the number of '0'. If all are 'Erase' that is if data has been erased, and if the numbers of '1' and '0' are equal to each other, the code $R'_i$ is used and the output of the Hamming majority processor 62 is set to $S_{out}$. This embodiment is effective as an aid for such a case where data cannot be determined unequivocally, that is where data has become depleted.

Figure 9B:
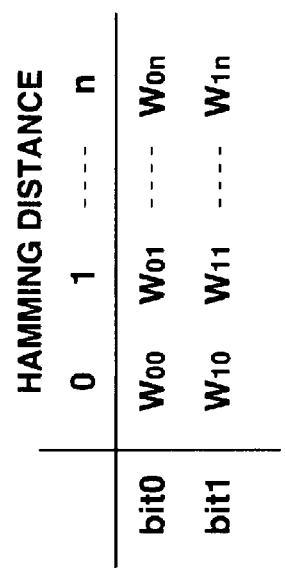
FIGS. 9A and 9B illustrate a third majority processing method carried out by a majority processor.
Figure 9A:
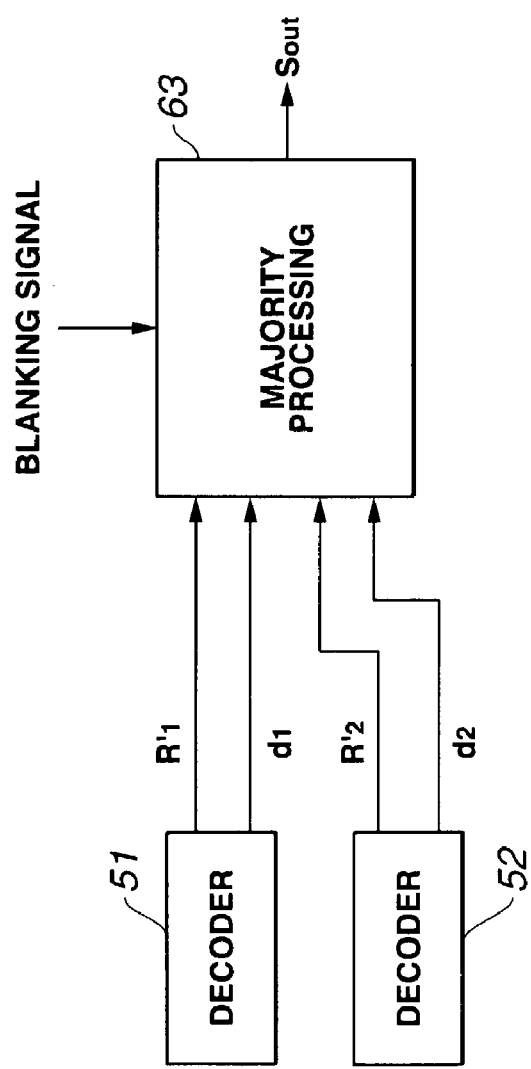

FIGS. 9A and 9B illustrate a third majority processing method carried out by the majority processing unit 55. With this third majority processing method, in distinction from the second method, shown in FIG. 8, the Hamming distance output from each of the decoders 51, 52 is multiplied with a weight derived from the error probability, in order to carry out calculations. Referring to FIG. 9A, each of the decoders 51 and 52 outputs a symbol $R'_i$ with the smallest Hamming distance of the bit string allocated to each symbol, with respect to the totality of bit strings, and the Hamming distance $d_i$. In majority processing 63, the information shown in FIG. 9B is held. That is, there are formed and provided coefficients $W_{jd}$ determined on the basis of the probability that the respective bits j of the selected symbols are in error, and on the basis of the Hamming distance. These coefficients $W_{jd}$ are set so as to be maximum for the Hamming distance equal to 0 and become smaller with the increasing Hamming distance.

In the majority processing 63, the coefficients $W_{jdi}$, determined on the basis of the Hamming distance $d_i$, as obtained, are set to a positive number $W_{jdi}$ and a negative number $-W_{jdi}$ when the bits of the symbol are '1' and '0', respectively, and the sum of the coefficients is calculated for the totality of the bits received. The majority processing 63 outputs '1' and '0' when the results of the calculations indicate the positive number and the negative number, respectively.

FIGS. 10A to 10D illustrate a concrete example of the calculations by the third majority processing method shown in FIGS. 9A and 9B. It is here assumed that values shown in FIG. 10A are obtained as a symbol $R'_i$, input to the majority processing 63, and that values shown in FIG. 10B are obtained as the Hamming distance $d_i$. It is also assumed that the weighting coefficient $W_{jd}$ are determined to values shown in FIG. 10C. Specified calculations are illustrated in FIG. 10D. Since the Hamming distance for '$d_1$' is 4, as shown in FIG. 10B, the coefficients $W_{jd}$, obtained from FIG. 10C, are '2' and '1' for bits 0 and 1, respectively. Since the bit 0 and bit 1 are '0' and '1', respectively for the symbol $R'_1$ shown in FIG. 10A, '2' and '1' are negative numbers, so that '−2' and '−1' are obtained. Similarly, '+32' is obtained from the symbol $R'_2$ and the hamming distance $d_2$. The bit 1 is not used repeatedly and hence is excluded. The sum is equal to '29' which is larger than '0' so that '1' is obtained as the sum $S_{out}$ from majority processing 63. With the third majority processing method, in which decision is made on the basis of weighting based on the probability of occurrence of closer codes, the error rate can be improved appreciably as compared to decision based on simple majority.

Figure 11:
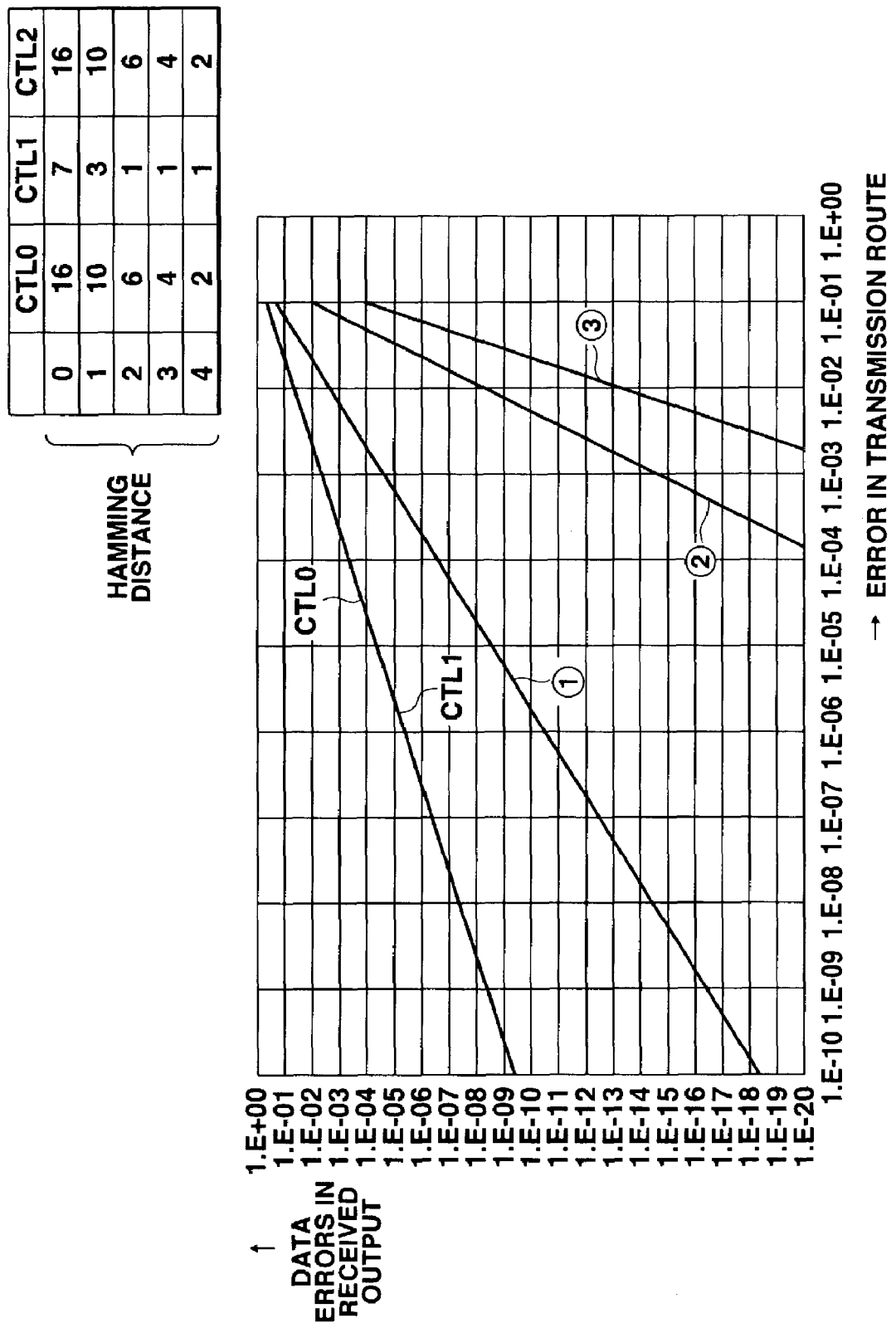
FIG. 11 shows the relationship between the errors on a transmission path and data errors caused in an actually received symbol.

FIG. 11 shows the relation between errors in the transmission path and data errors produced in actually received symbols. In the drawing, the abscissa and the ordinate denote the values of errors in the transmission path and the values of data errors in the output received. In FIG. 11, CTL0 and CTL1 denote each CTL being transmitted straightly, while ① to ③ denote the results of using majority processing in the present embodiment. The weighting for each of these methods is as indicated in a graph shown on the right top side. ①, ② and ③ indicate the first majority processing, second majority processing and third majority processing, as described above, respectively. Here, the weighting is determined for CTL0, CTL1 and CTL2 to which the same superposed data is sent. It will be understood that data errors in output data may be improved by sending the same superposed data a plural number of times, as ① to ③, than if the superposed data is sent only once. The error rate can be appreciably lower with the '② second majority processing method' in which the decision is given for a symbol with the smallest distance in case decision in majority taking is ambiguous due to 'Erase' than with the simple majority taking by the '① first majority processing'. The error rate improving effect may be ameliorated by adopting the soft decision by distance weighting according to '③ third majority processing'.

INDUSTRIAL APPLICABILITY

With the data transmission method according to the present invention, as described above, errors in reception of supplementary data may be reduced. Moreover, with the video data reception apparatus, according to the present invention, it is possible to simplify the circuit structure to improve the error rate in the superposed data.

The invention claimed is:

1. A method for transmitting data over a plurality of transmission channels using an interface for digital display connection, comprising:

converting a video signal for transmission into a bit string longer than the data length of a pixel forming said video signal;

allocating a plurality of bit strings representing data other than data of the pixel to a blanking period of the converted bit string during which the video signal is not transmitted;

encoding data including the superposed data transmitted at least more than three times by converting data by each plural bit data into one of a plurality of the bit strings; and transmitting each bit string of converted data by allocating each bit string to the blanking period of either one of at least two channels out of a plurality of transmission channels.

2. The data transmission method according to claim 1 wherein the plural bit strings are plural codes indicating blanking period and the superposed data for transmission is transmitted using plural codes.

3. The data transmission method according to claim 1 wherein the superposed data for transmission affects audio data.

4. A method for receiving data wherein a plurality of transmission channels are provided a video signal for transmission into a bit string longer than the data length of a pixel forming said video signal is converted, a plurality of bit strings representing data other than data of the pixel is allocated to a blanking period of the converted bit string during which the video signal is not transmitted, data including the same superposed data transmitted at least more than three times by converting data by each plural bit data into one of the plural bit strings is encoded, and each bit string of converted data by allocating each bit string to be blanking period of either one of at least two channels out of the plural transmission channels is transmitted comprising:

receiving digital video signals coupled to an interface for digital display connection, said digital video signals of the plural transmission channels including the blanking period represented by a plurality of bit strings;

extracting, from the received digital video signals of the plural transmission channels, a plurality of specified bit strings indicating said blanking period; and performing majority processing out of at least three superposed data on the results of demodulation of a plurality of the extracted bit strings from the blanking period of at least two channels out of the plural transmission channels to decide on the superposed data.

5. An apparatus for transmitting video data comprising:

inputting means for inputting the video data for transmission over a plurality of transmission channels and superposed data to be added to said video data; and encoding means for encoding data including the same superposed data transmitted at least more than three times by converting data by each plural bit data into one of a plurality of the bit strings when converting said video data input from said inputting means into serial data and allocating the plural bit strings to a video blanking period wherein each bit string of converted data by allocating each bit string to the blanking period of either one of at least two channels out of the plural transmission channels is transmitted.

6. The apparatus for transmitting video data according to claim 5 wherein said inputting means receives, as input, the video data of R, G and B or Y, R-Y and B-Y and audio data as said superposed data;

said encoding means allocating the video data of R, G and B or Y, R-Y and B-Y, input to said inputting means, to codes longer than the bit length of said video data; said encoding means effecting conversion in association with respectively independent channels of R, G and B or Y, R-Y and B-Y, and causes the same audio data to be included in the plural codes allocated to the video blanking period of the respective channels.

7. An apparatus for receiving video signals wherein a plurality of transmission channels are provided, a video signal for transmission into a bit string longer than the data length of a pixel forming said video signal is converted, a plurality of bit strings representing data other than data of pixel is allocated to a blanking period of the converted bit string during which the video signal is not transmitted, data including the same superposed data transmitted at least more than three times by converting data by each plural bit data into the plural bit strings is encoded, and each bit string of converted data by allocating each bit string to the blanking period of either one of at least two channels out of the plural transmission channels is transmitted, comprising:

receiving means for receiving digital video signals, said receiving means being connected to an interface for digital display connection, said digital video signals receiving digital video signals including a blanking period represented by the plural bit strings;

bit string extracting means for extracting specified bit string indicating said blanking period from the digital video signals received by said receiving means;

demodulating means for demodulating each bit string extracted from the blanking period of at least two channels out of the plural transmission channels by said bit string extracting means; and output data determining means for deciding on output data by majority taking at least three superposed data resulting from demodulation of each one of the plural bit strings by said demodulating means.

8. The video signal receiving apparatus according to claim 7 wherein said output data determining means selects the one of the bit strings allocated to respective symbols as indicating said blanking period which has the smallest Hamming distance with respect to the bit string received by said receiving means to decide on the output data.

9. The video signal receiving apparatus according to claim 8 wherein said output data determining means decides on output data based on the probability of the bit string with the smallest Hamming distance being an error.

10. A video signal receiving apparatus according to claim 7 comprising:

audio data outputting means for outputting audio data based on output data wherein the plural bit strings extracted from the blanking period of at least two channels out of the plural transmission channels is decided by said output data determining means on a least three superposed data on the results of demodulation of each one of the plural bit strings by said demodulating means.

11. A video signal transmitting/receiving system for sending digital video signals from a transmitter to a receiver over a plurality of transmission channels;

said transmitter converting the video signals for transmission into a bit string longer than the data length of a pixel making up said video signals, allocating a plurality of said bit strings representing data other than data of the pixel to a blanking period during which data of the pixels in said bit string is not transmitted, encoding data including the same superposed data transmitted at least more than three times by converting data by each plural bit data into one of a plurality of the bit strings;

transmitting each bit string of converted data by allocating each bit string to the blanking period of either one of at least two channels out of the plural transmission channels;

said receiver receiving digital video signals coupled to an interface for digital display connection, said digital video signals of the plural transmission channels including the blanking period represented by the plural bit strings;

extracting from the received digital video signals of the plural transmission channels, a plurality of specified bit strings indicating said blanking period; and performing majority processing out of at least three superposed data on the results of demodulation of a plurality of the extracted bit strings from the blanking period of at least two channels out of the plural transmission channels to decide on the superposed data.

12. A computer-readable medium having computer-executable instructions for performing a method for digital display connection, the method comprising:

converting a video signal for transmission into a bit string longer than the data length of a pixel forming the video signal;

allocating a plurality of bit strings representing data other than data of the pixel to a blanking period of the converted bit string during which the video signal is not transmitted;

encoding data including the same superposed data transmitted at least more than three times by converting data by each plural bit data into one of the plural bit strings; and transmitting each bit string of converted data by allocating each bit string to the blanking period of either one of at least two channels out of the plural transmission channels.

* * * * *